United States Patent [19]

Levine et al.

[11] Patent Number: 5,391,024
[45] Date of Patent: Feb. 21, 1995

[54] METHOD FOR MULTI-CRITERIA FLANK MILLING OF RULED SURFACES

[75] Inventors: Alan R. Levine, Westwood; Brad W. Amidon, Malden, both of Mass.

[73] Assignee: Northern Research & Engineering Corporation, Mass.

[21] Appl. No.: 221,211

[22] Filed: Mar. 31, 1994

[51] Int. Cl.⁶ .............................................. G06F 15/40
[52] U.S. Cl. .................................... 409/84; 318/568.15; 364/474.29; 451/5; 451/28
[58] Field of Search .................... 409/80, 84, 131, 132; 51/165.71, 281 R, 281 P, DIG. 14; 318/568.15, 568.19, 568.23; 364/474.28, 474.29, 474.36

[56] References Cited

U.S. PATENT DOCUMENTS

| | | | |
|---|---|---|---|
| 3,750,345 | 8/1973 | Kolesar et al. | 51/101 |
| 4,558,977 | 12/1985 | Inoue et al. | 409/80 |
| 4,619,079 | 10/1986 | Kidani | 51/165.71 |
| 4,794,540 | 12/1988 | Gutman et al. | 364/474.29 |
| 4,953,106 | 8/1990 | Gansner et al. | 364/521 |
| 4,968,195 | 11/1990 | Hayakawa et al. | 409/84 |
| 5,028,855 | 7/1991 | Distler et al. | 318/568.13 |
| 5,107,436 | 4/1992 | Levine et al. | 364/474.28 |
| 5,122,966 | 6/1992 | Jansen et al. | 364/474.2 |
| 5,140,236 | 8/1992 | Kawamura et al. | 318/568.1 |

Primary Examiner—Z. R. Bilinsky
Attorney, Agent, or Firm—Michael H. Minns

[57] ABSTRACT

A method for determining machining instructions for flank milling of a workpiece which reduces the undercut by analyzing the cutter orientation at a plurality of orientations to determine an orientation which results in a minimum undercut, smooths the machining instructions by analyzing the movement of the cutter and the workpiece in spherical coordinates and improves machinability by analyzing for near-axial conditions and selecting a modified cutter orientation for such near-axial conditions using a multi-criteria weighting factor.

7 Claims, 6 Drawing Sheets

```
C -- HEDSCR IS A PENALTY IF THE PHI VARIABLE IS LARGER AT THE
     BOTTOM OF THE RANGE COMPARED TO THE TOP OF THE RANGE
       IF (APHI(IBOT) .GT. APHI(ITOP)) THEN
         HEDSCR = 2.0 + 10.0*(APHI(IBOT) - APHI(ITOP))
       ELSE
         HEDSCR = 0.0
       END IF

C -- ZNEG IS A MACHINABILITY CONSTRAINT, IF THE MACHINING INSTRUCTION
     POINTS RADIALLY INWARD, A LARGE PENALTY IS APPLIED
       IF (COS(ATHETA(I))*PTHXYZ(1,I) +
          SIN(ATHETA(I))*PTHXYZ(2,I) .LT. 0.0) THEN
         ZNEG = 5.0
       ELSE
         ZNEG = 0.0
       END IF

C -- ACCUMULATE THE TOTAL MOTION IN PHI AND THETA.
     IF AN AXIS REVERSAL OCCURS IN PHI OR THETA, A PENALTY IS APPLIED.
       P1 = APHI(I) - APHI(I-1)
       T1 = ATHETA(I) - ATHETA(I-1)
       P2 = APHI(I+1) - APHI(I)
       T2 = ATHETA(I+1) - ATHETA(I)
       IF (P1*P2 .LT. 0.0) SUMPHI = SUMPHI + 0.5
       IF (T1*T2 .LT. 0.0) SUMTHE = SUMTHE + 0.5
       SUMPHI = SUMPHI + ABS(P1)
       SUMTHE = SUMTHE + ABS(T1)

C -- PENALIZE ANY INSTRUCTION WHERE THE MACHINING-TO-PART-MOTION
     RATIO EXCEEDS 2.0
       CALL MACAPT(PTHXYZ, ATHETA, I, I-IDEL, RATIO)
       MAXRAT = MAX(0.0,(RATIO-2.0))

C -- THERE IS NO PENALTY IF THE PREDICTED UNDERCUT IS LESS THAN SOME
     SPECIFIED TOLERANCE (LOWBND). ANY AMOUNT BETWEEN 1.0 AND 4.0 TIMES
     THE TOLERANCE IS APPLIED LINEARLY. ANY AMOUNT OVER 4.0 TIMES THE
     TOLERANCE IS APPLIED PARABOLICALLY.
       XLIM = BMAX/LOWBND
       IF (XLIM .LE. 1.0) THEN
         BLIM = 0.0
       ELSEIF (XLIM .LE. 4.0) THEN
         BLIM = XLIM - 1.0
       ELSE
         BLIM = XLIM*(XLIM-7.0) + 15.0
       END IF

C -- ACCUMULATE ALL OF THE PENALTIES FOR THIS INSTRUCTION.
       SCORE = HEDSCR +
               ZNEG +
               BLIM +
               SUMTHE +
               SUMPHI +
               MAXRAT
```

FIG.8

METHOD FOR MULTI-CRITERIA FLANK MILLING OF RULED SURFACES

BACKGROUND OF THE INVENTION

This invention relates generally to numeric controlled machining of parts and more particularly to a method for flank milling of ruled surfaces.

Creation of machining instructions for flank milling of ruled surface components is perceived to be a simple task. However, practical limitations such as finite cutter thickness, surface description, and milling machine shortcomings yield results that compromise final dimensions and surface quality.

Twisted ruled surfaces commonly found in aerodynamic designs are characterized by the difference in blade angle between corresponding hub and shroud contour points. These surfaces can be seriously undercut during flank milling if the alignment of the cutting tool simply follows the desired line-element rulings. The resulting blade thinning may exceed profile tolerances and cause vibration or structural problems.

Standard flank milling practice is to place the cutting tool tangent to the blade surface and normal to the hub and shroud endpoints of a particular line element. However, if the surface normal at the hub differs from that at the shroud, a cutter skewed to make contact at these two tangencies results in a surface undercut causing reduced blade thickness. This undercut is greatest near the mid-streamline of the blade since by design no error exists at the hub and shroud contours.

A useful analogy is to visualize a string (the line element) connecting two points at different positions on the surface of a cylinder (the cutting tool). If the string were merely laid across the surface of the cylinder, it would form a curve segment like a spiral. However, if the string is forced to follow a straight line, it must necessarily intrude into the surface of the cylinder. The amount of this intrusion represents the undercut.

In this model, the undercut error is proportional to the offset from the blade surface to the tool centerline (tool radius and taper) and the direction of this offset (blade angles at the hub and shroud). Surprisingly, the error is not directly related to the size of the blade, but, because tool sizes are often selected and maximized to fit a particular part size, an indirect relation exists. For a cylindrical cutting tool, the error may be approximated as:

$$\epsilon = r(1 - \cos(\theta/2))$$

where r is the tool radius and $\theta$ is the difference in blade angle. The error may be split across the line element, but the total cannot be reduced further with this approach. For conical cutting tools, the formulation is similar.

Because undercut is related to the twist in the blade surface, errors are largest in areas of the inducer section of a compressor. Other classes of turbomachinery, including radial-inflow turbines, experience undercut less often because they are designed with little or no twist between the hub and shroud contours.

Many techniques are currently employed in an attempt to deal with the problem of undercut. Of course, the most common solution is to do nothing. For many designs, the degree of undercut is small enough to avoid exceeding profile tolerances.

In some software packages, multiple passes are used to create sets of "mini-ruled surfaces." Undercut is reduced, but a wavy surface results. If enough multiple passes are taken, it becomes a point-milling solution. No undercut exists because very little of the cutting tool makes contact with the surface. However, this technique sacrifices machining time efficiency and the superior surface finish that can result from effective flank milling.

To balance machining time and reduce undercut, a moderate number of passes may be used to minimize undercut, followed by manual hand finishing to achieve smooth blade surfaces. Like so many compromises, however, the balanced approach optimizes neither the machining time nor the part quality.

Another solution is to select two rails (streamlines) for computation along the line element and let the cutting tool pivot along these rails to locations with reduced undercut. Common rail selections are hub and shroud contours, or 20% and 80% streamlines. This method retains the benefits of flank milling but generally requires trial and error and is cumbersome. Although undercut reduction is possible, an optimal solution is not assured.

One approach tried by the present inventors extends the trial and error method found in CAD/CAM systems to algorithmically determine the ideal rail extent and cutting tool tilt angle that minimize surface error. The rail extent and tilt vary smoothly as the tool proceeds around the entire blade surface. As rail extent and tilt values change, the surface formed by the swept cutting tool also changes. At its simplest, reorienting the line elements on a ruled surface geometry creates a different blade surface. Similarly, changing the cutting tool orientation in flank milling produces a different surface envelope. A better approach to reducing and optimizing machine performance is described below.

Machining instructions and machined components can be enhanced by using additional constraints in the mathematical formulations. Concepts such as surface analysis, blueprint tolerances, and understanding machine tool motion, when integrated with standard methods produce parts with desirable characteristics.

The foregoing illustrates limitations known to exist in present methods for flank milling of ruled surfaces. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for determining machining instructions for machining a workpiece wherein the method reduces the undercut by analyzing the cutter orientation at a plurality of orientations to determine an orientation which results in a minimum undercut, smooths the machining instructions by analyzing the movement of the cutter and the workpiece in spherical coordinates and improves machinability by analyzing for near-axial conditions and selecting a modified cutter orientation for such near-axial conditions using a multi-criteria weighting factor.

The foregoing and other aspects will become apparent from the following detailed description of the invention when considered in conjunction with the accompanying drawing figures.

DETAILED DESCRIPTION

Figure 1:
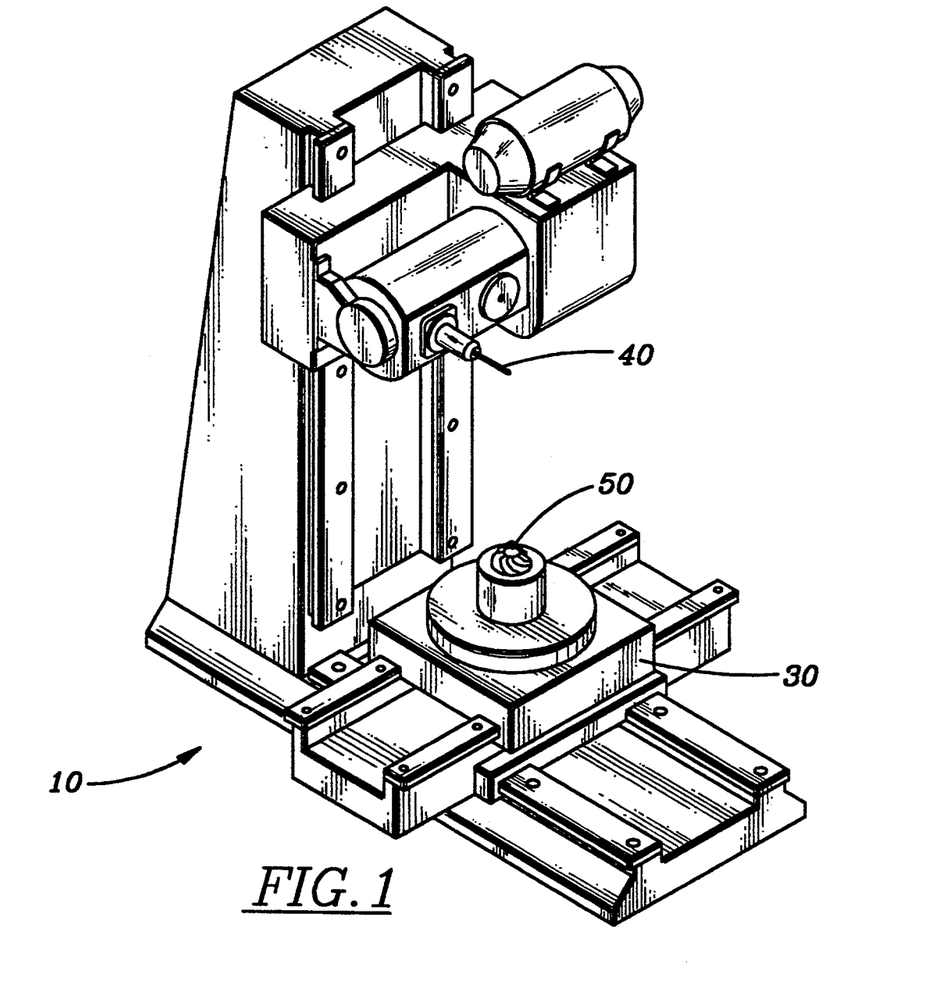
FIG. 1 is a perspective view of a five-axis milling machine including workpiece.

FIG. 1 shows a typical five-axis milling machine 10. A workpiece 50 is mounted on a workpiece table 30. A typical five-axis milling machine uses three Cartesian axes of motion and two rotary axes of motion. For the machine 10 shown in FIG. 1, the workpiece table 30 moves in two Cartesian directions and the workpiece 50 mounted on the table 30 moves in one rotary direction. The cutter 40 moves in one Cartesian direction and one rotary direction.

Figure 2:
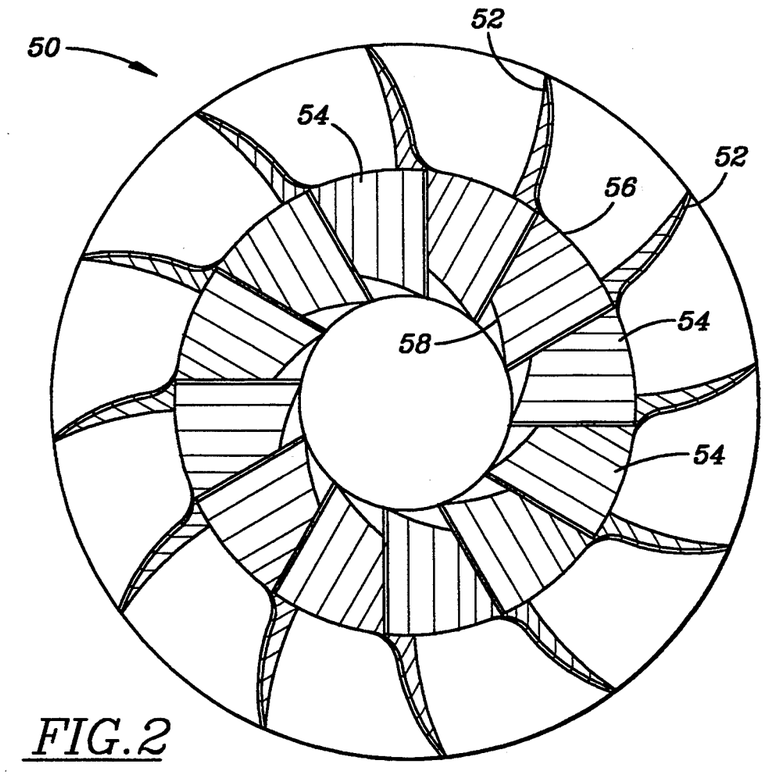
FIG. 2 is a top view of a representative workpiece.

A typical rotodynamic part or workpiece 50 is shown in FIG. 2. Shown is an impeller with a plurality of blades 52. Each blade 52 can be defined by a plurality of ruled surfaces. A ruled surface is a surface defined by two curves 56, 58 connected by a plurality of straight lines 54. The ruled surface may be a complex three dimensional surface. For twisted surfaces, the straight lines 54 are not necessarily parallel. Depending on the locations of the guide curves, 56, 58 and the connecting rulings 54, such parts may be very twisted as in the design of rotating machinery components, such as the workpiece 50 shown in FIG. 2.

Figure 3:
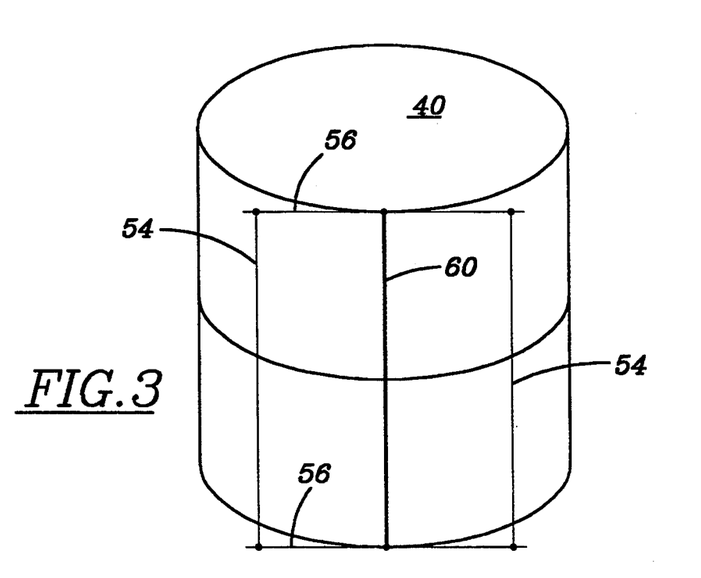
FIG. 3 is a simplified view of a portion of a workpiece and milling tool.

In the "pure" geometric solution for flank milling of ruled surfaces, the cutter 40 is located tangent to the ruled surface guide curves 56, 58 at the junctions of the rulings 54, as shown in FIG. 3. The tangency between the cutter 40 and the ruled surface is shown by line 60 in FIG. 3. Line 60 is coincident with a ruling 54. A discrete surface model is sufficient for the "pure" calculation. This solution is also known as isoparameterization.

Figure 4:
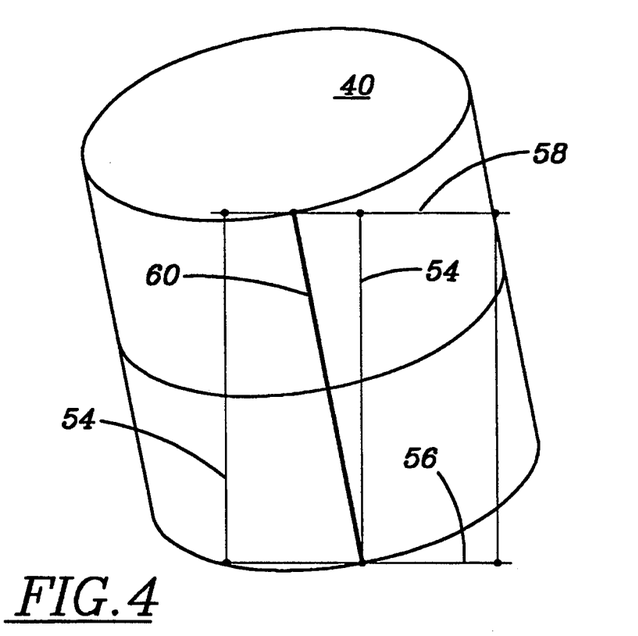
FIG. 4 is a simplified view of a portion of a workpiece and milling tool, illustrating an alternate orientation.

The tangency computation can also be made if the surface is defined with continuous topological functions such as spline curves and surfaces. Improvements are possible when advanced techniques, such as non-isoparametric tangency locations, illustrated in FIG. 4, are used. The cutter 40 is located tangent to the ruled surface guide curves 56, 58, but is not tangent to the rulings 54. The selection of the optimal tangency location adds a degree of freedom to the formulation which allows the specification of additional criteria.

While both tangency locations are variables of the problem, for simplification, one location remains fixed and the other is positioned relative to the first. As described below, the cutter tip remains fixed and the cutter shank is positioned relative to the cutter tip. Also, while the second tangency point may be found along a guide curve, on a ruling, or anywhere on the surface, the method described below limits its motion along a guide curve.

Flank milling of ruled surfaces may introduce two significant problems. These are 1) tolerance issues due to undercut of the ruled surface, and 2) excessive rotary table motion that results in either an unmachinable part or poor surface quality.

Figure 5:
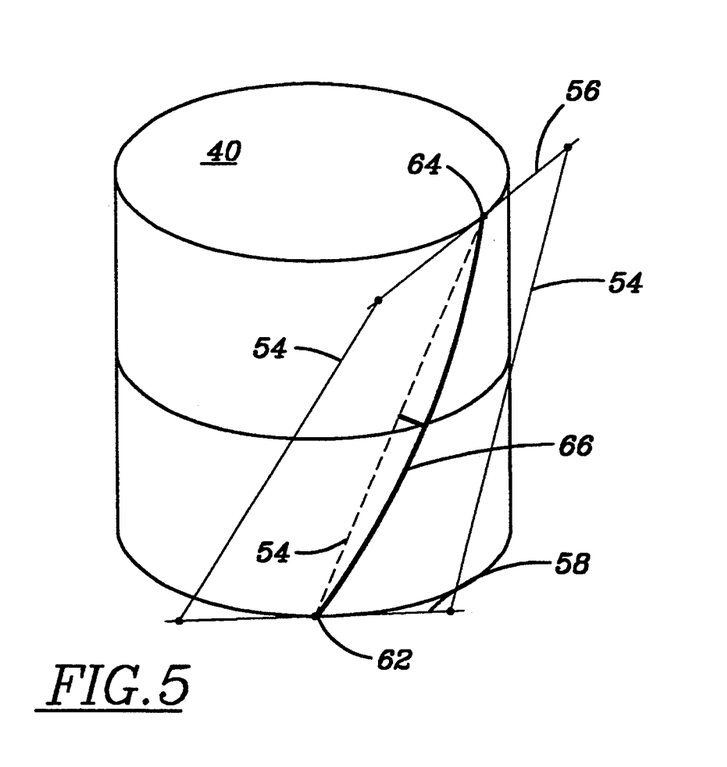
FIG. 5 is a simplified view of a portion of a workpiece and milling tool, illustrating undercut.

Excessive profile tolerance is due to the undercut between the cutter and a twisted ruled surface. While surface contact is made between the cutter and the workpiece, the cutter location is generally computed based on two representative points, 62, 64 on the surface. The cutter 40 can undercut the surface at other locations. FIG. 5 illustrates this undercutting. Rulings 54 define the desired surface. The undercut is shown by line 66 where the cutter 40 has removed more material than desired. In many cases, the undercut error is greater than the manufacturing tolerances and the flank milling process does not produce an acceptable part. Alternative procedures are required which may include more costly point milling, or the use of additional manufacturing process to produce a part within tolerance.

The problem of machinability and surface quality arises when the cutter vector is near-axial. In these locations, large rotary table motion occurs which is an unmachinable condition.

For twisted ruled surfaces, five-axis milling machines 10 are generally required to machine the complex twisted surfaces. The workpiece 40 is usually mounted on the rotary table 30 in a manner so that the axis of revolution of the table 30 coincides with that of the workpiece 50. The large machine motion arises from the mathematical formulation of the rotary table positions. Even though typical computations are made in Cartesian coordinates, the location of the rotary axis (table angle) is defined by the spherical $\theta$ coordinate of the cutter vector. The table angle is formed by the projection of the cutter vector into the plane of the rotary table 30. For near axial locations (within 10° of the table axis of rotation) a small change in the Cartesian description of the cutter vector location results in a large change in the spherical description (table angle).

With excessive table axis motion, the cutter 40 and workpiece 50 may move into a void zone on the milling machine 10 and either 1) result in an unmachinable part, or 2) require the use of larger milling equipment than anticipated to produce the component. In other cases, the table axis motion produces tool tip travel which is much larger than the corresponding distance along the workpiece. The result is that the cutter 40 follows a non-linear path between commanded positions and resulting in a scalloped surface with poor surface finish characteristics.

To overcome the shortcomings of a standard flank milling formulation, the following method is used:

1.0 Preliminary Undercut Analysis 1.1 Compute the nominal flank milling solution (isoparametric tangency solution) at an individual cutter location.

1.2 Intersect the cutter and the workpiece surface to determine the cutter orientation and to quantify the undercut. The undercut value at each cutter position represents the largest deviation between the surface and the cutter.

1.3 For a fixed cutter tip location, perform similar analysis at other locations by sliding the cutter shank location along one of the ruled surface guide curves forward and aft (non-isoparametric tangency solution). Store the data for the location having minimum surface error. Empirically, there appears to be a minimum point. If the surface error begins to increase as the cutter shank is moved in one direction, then move the cutter shank in the other direction.

1.4 Repeat step 1.4 for a sparse number (20 to 30) of locations around the surface contour. The locations are spaced closer together where curvature is higher. The sparse number is determined to be small relative to the total number of machining locations, but large enough to model all surface features.

2.0 Global Undercut Based Solution (using spherical coordinates)

2.1 Create independent spline functions through the $\theta$ and $\phi$ values (cutter orientation) of the sparse points. Although a spline function is preferred, other curve fit functions may be used.

Figure 7:
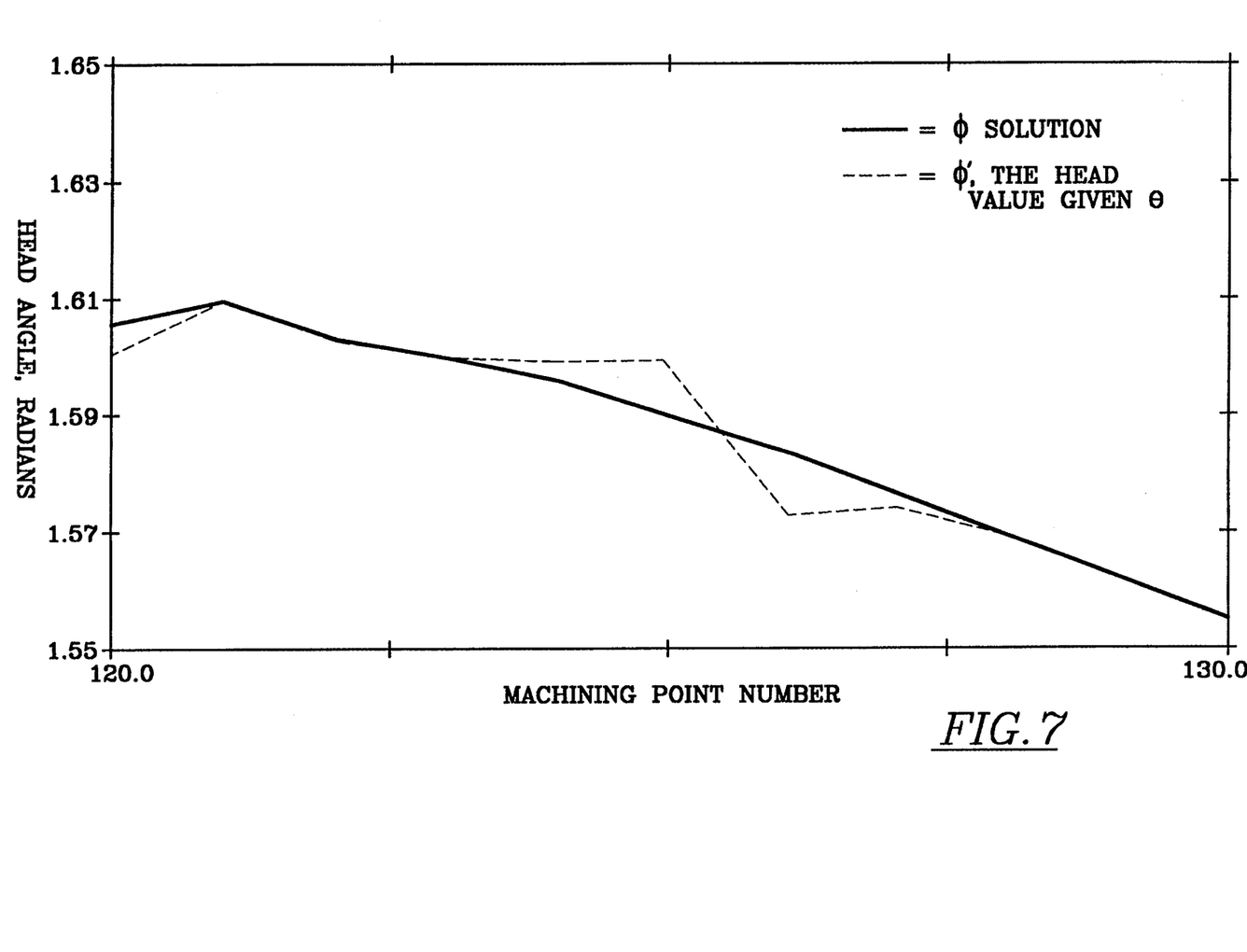
FIG. 7 is a graph showing the smooth head angle $\phi$ and the head angle $\phi'$ computed based upon the smooth table angle $\theta$.

2.2 For each machining point, first evaluate the $\theta$ spline and compute $\phi'$ so that the cutter 40 lies on the ruled surface guide curves, 56, 58. FIG. 7 illustrates typical curves for $\phi$ and $\phi'$.

Figure 6:
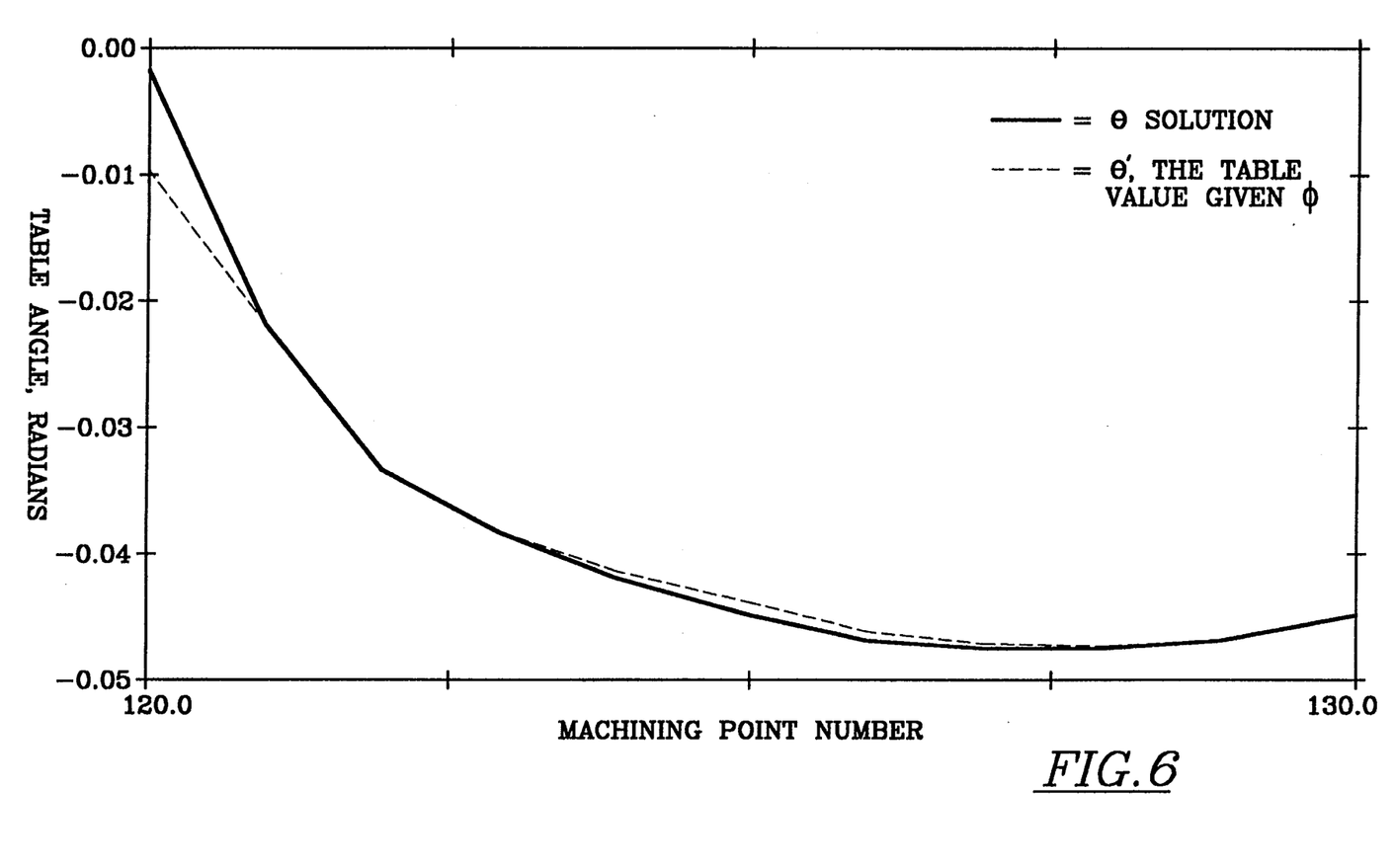
FIG. 6 is a graph showing the smooth table angle $\theta$ and the table angle $\theta'$ computed based upon the smooth head angle $\phi$.

2.3 For each machining point, evaluate the $\phi$ spline and compute $\theta'$ so that cutter 40 lies on the ruled surface guide curves 56, 58. FIG. 6 illustrates typical curves for $\theta$ and $\theta'$.

2.4 Select the spline curve which results in the least motion of the other spherical angle. For each machining point, $\theta$ and $\phi$ specify the cutter orientation.

2.5 Given the cutter orientation, undercut values at intermediate (between spline nodes) points are calculated.

2.6 The undercut at the intermediate locations is approximately the same as at the neighboring sparse points where it has been minimized. If the undercut is too large at a mid-span point, an additional sparse point is added and the process is repeated. Nominally, the undercut is acceptable if it is less than 0.004 inches and within ten percent of adjacent points.

3.0 Near-Axial Analysis 3.1 At each sparse point and based on the local cutter orientation solution, compute the ratio of machine motion to workpiece motion. The workpiece motion is the distance along the ruled surface guide curves between two machining instructions. The machine motion is the cutter tip distance between two machining instructions.

3.2 Identify the location in which this ratio is beyond a predetermined ratio, nominally 2.

3.3 Identify the region on the surface having a near-axial condition. For a centrifugal impeller application, this is typically the exducer region near the outer diameter.

3.4 In this region, override the cutter orientation by evaluating machinability as a weighted average of the local undercut, machine motion ratio, total angular motion, and class-specific conditions such as radially-inward cutter vectors.

3.5 Respline the near-axial region using the data having a minimum weighted average.

To determine an acceptable cutter orientation where the machine motion to workpiece motion ratio is unacceptable, the cutter orientation is changed and a weighting factor is determined as follows:

Weighting Factor=Hedscr+Zneg+Blim+Sumthe+­Sumphi+Maxrat.

where:

Hedscr is a penalty if the $\phi$ variable is larger at the bottom of the range compared to the top of the range;

Zneg is a machinability constraint, if the machining instruction points radially inward, a large penalty is applied;

Sumthe and Sumphi are the sums of the total motion in $\phi$ and $\theta$. If an axis reversal occurs in $\phi$ or $\theta$, a penalty is applied;

Maxrat is a penalty applied where the machining motion to part motion ratio exceeds 2.0;

Blim is a penalty applied if the predicted undercut is greater than a specified tolerance. Any amount between 1 and 4 times the tolerance is applied linearly. Any amount over 4 times the tolerance is applied parabolically.

Figure 8:
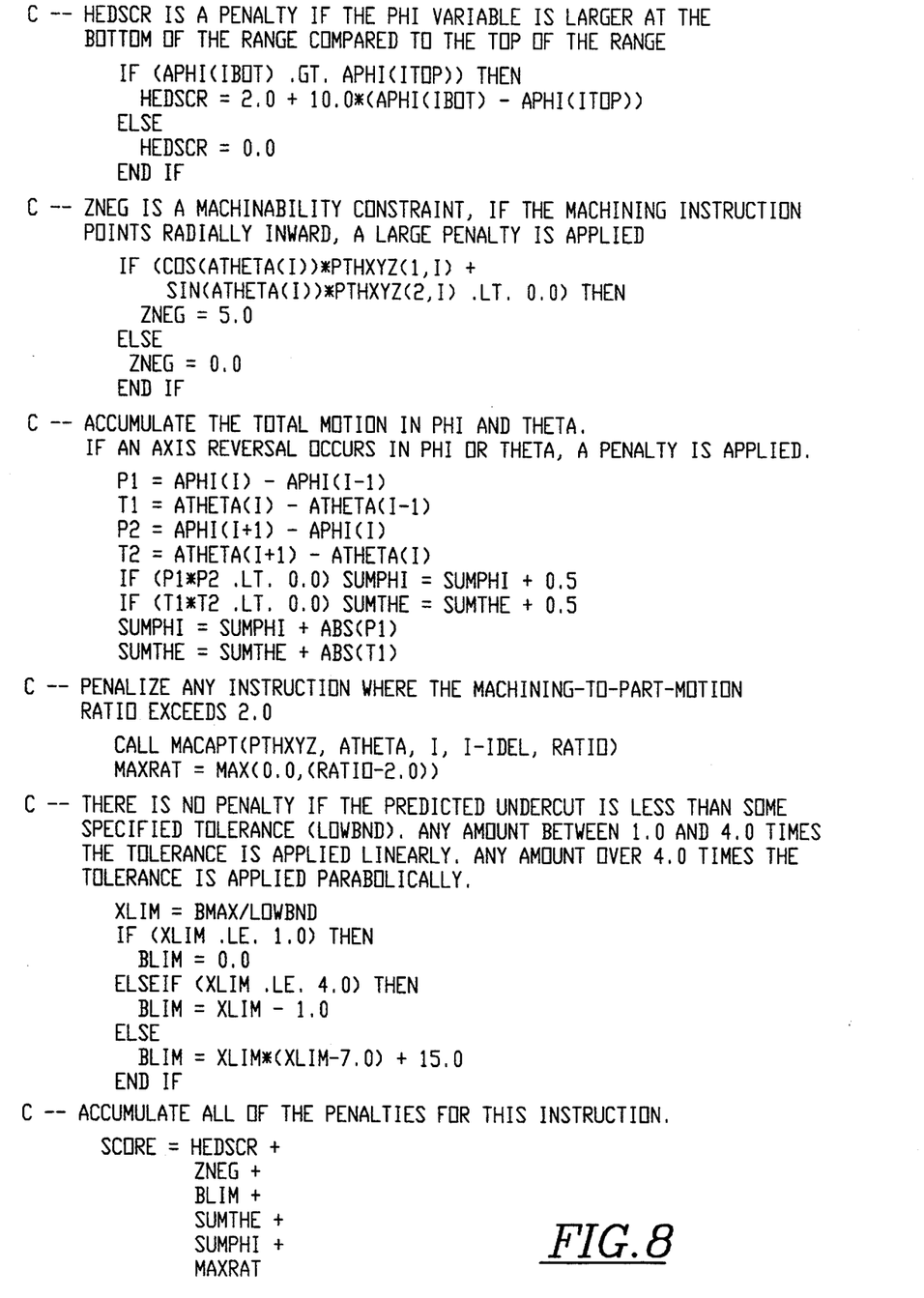
FIG. 8 is listing showing the determination of the multifunction weighting factor.

FIG. 8 shows the application of the multi-criteria weighting factor, SCORE.

The method described above specifically uses ruled surfaces and guide curves. The method is not limited to either ruled surfaces or guide curves. The second tangency point determined in step 1.3 may be found along a guide curve, on a ruling, or anywhere on the surface.

Advantages of this method for multi-criteria flank milling of ruled surfaces include:

Profile deviations are improved by perturbing the cutter locations and minimizing the total surface error;

Smooth instructions are enforced by creating spline functions through sparse fixed points (undercut condition). The splined parameter is the actual machining coordinate;

The smooth machine motion produces consistent forces on the cutting tool and enhances the life of the cutter;

Near-axial analysis to reduce machine motion allows a smaller machine tool to be used for the same size part; and Reduced machine motion reduces non-linear rotary moves, improves the "path" selected by the machine tool between commanded positions, and results in improved surface quality.

Having described the invention, what is claimed is:

1. A method of determining machining instructions during machining of a workpiece using a machine having a cutter, the surfaces of the workpiece being defined by a plurality of guide curves, including the steps of:

determine a nominal flank milling machining instruction at an individual cutter location;

evaluate the intersection of the cutter and the workpiece surface to determine the cutter orientation and to determine the undercut;

modify the cutter orientation, evaluate the intersection of the cutter and the workpiece surface at a plurality of cutter orientations to determine the undercut, determine the cutter orientation having the minimum undercut;

at a first plurality of cutter locations, repeat the steps of: determining a nominal flank milling instruction at a cutter location; determining the cutter orientation and undercut; modifying the cutter orientation, determining a plurality of undercuts at the plurality of cutter orientations and determining the cutter orientation having the minimum undercut at the first plurality of cutter locations around the workpiece surface contour being machined;

using the plurality of cutter locations and orientations having minimum undercut, determine curves which fit the cutter orientation spherical coordinates, $\theta$ and $\phi$;

for each individual cutter location, using the values $\theta$ from the $\theta$ curve fit, determine a value for $\phi'$ such that the cutter lies on a workpiece guide curve;

for each individual cutter location, using the values $\phi$ from the $\phi$ curve fit, determine a value for $\theta'$ such that the cutter lies on a workpiece guide curve;

evaluate the plurality of $\theta'$ values and the plurality of $\phi'$ values to select which curve fit results in the least motion of the other spherical coordinate;

using the selected curve fit, determine undercut at a second plurality of cutter locations intermediate to the first plurality of cutter locations;

compare the determined undercut to a predetermined value, for such locations where the determined undercut exceeds the predetermined value, add an additional location to the first plurality of cutter locations and repeat the steps of: using a first plurality of cutter locations to determine the cutter location having a minimum undercut; determining curve fits for the cutter orientation spherical coordinates; determining values for $\phi'$ and $\theta'$; evaluating the $\phi'$ values and the $\theta'$ values to select the curve fit which results in the least motion of the other spherical coordinate; and determining the undercut at the second plurality of locations intermediate to the first plurality of locations;

for each of the plurality of first locations, determine the ratio of machine motion to workpiece motion;

compare the determined ratio to a predetermined ratio;

for locations where the determined ratio exceeds the predetermined ratio and the cutter $\phi$ spherical angle is less than a predetermined angle, modify the cutter orientation to reduce the ratio of machine motion to part motion.

2. A method of determining machining instructions during machining of a workpiece using a machine having a cutter, the surfaces of the workpiece being defined by a plurality of ruled surface guide curves, including the steps of:

determine a nominal flank milling machining instruction at an individual cutter location;

determine the cutter orientation and determine the undercut by evaluating the intersection of the cutter and the workpiece surface;

for a fixed cutter tip location, modify the cutter orientation by sliding the cutter shank along one of the ruled surface guide curves, determine the undercut by evaluating the intersection of the cutter and the workpiece surface at a plurality of cutter orientations, select the cutter orientation having the minimum undercut;

at a first plurality of cutter locations, repeat the steps of: determining a nominal flank milling instruction at a cutter location; determining the cutter orientation and undercut; modifying the cutter orientation, determining a plurality of undercuts at the first plurality of cutter orientations and determining the cutter orientation having the minimum undercut at the first plurality of cutter locations around the workpiece surface contour being machined;

using the plurality of cutter locations and orientations having minimum undercut, determine spline functions for the cutter orientation spherical coordinates, $\theta$ and $\phi$;

for each individual cutter location, using the values $\theta$ from the $\theta$ spline function determine a value for $\phi'$ such that the cutter lies on the workpiece ruled surface guide curves;

for each individual cutter location, using the values $\phi$ from the $\phi$ spline function determine a value for $\theta$ such that the cutter lies on the workpiece ruled surface guide curves;

evaluate the plurality of $\theta'$ values and the plurality of $\phi'$ values to select which spline function results in the least motion of the other spherical coordinate;

using the selected spline function, determine undercut at a second plurality of cutter locations intermediate to the first plurality of cutter locations;

compare the determined undercut at the second plurality of cutter locations to a predetermined value, for such locations where the determined undercut exceeds the predetermined value, add an additional location to the first plurality of cutter locations and repeat the steps of: using a first plurality of cutter locations to determine the cutter location having a minimum undercut; determining spline functions for the cutter orientation spherical coordinates; determining values for $\phi'$ and $\theta'$; evaluating the $\phi'$ values and the $\theta'$ values to select the spline function which results in the least motion of the other spherical coordinate; and determining the undercut at the second plurality of locations intermediate to the first plurality of locations;

for each of the plurality of first locations, determine the ratio of machine motion to workpiece motion;

compare the determined ratio to a predetermined ratio;

for locations where the determined ratio exceeds the predetermined ratio and the cutter $\phi$ spherical angle is less than a predetermined angle, modify the cutter orientation to reduce the ratio of machine motion to part motion.

3. A method of determining machining instructions during machining of a workpiece using a machine having a cutter, the surfaces of the workpiece being defined by a plurality of guide curves, including the steps of:

determine a nominal flank milling machining instruction at an individual cutter location;

evaluate the intersection of the cutter and the workpiece surface to determine the cutter orientation and to determine the undercut;

modify the cutter orientation, evaluate the intersection of the cutter and the workpiece surface at a plurality of cutter orientations to determine the undercut, determine the cutter orientation having the minimum undercut;

at a first plurality of cutter locations, repeat the steps of: determining a nominal flank milling instruction at a cutter location; determining the cutter orientation and undercut; modifying the cutter orientation, determining a plurality of undercuts at the plurality of cutter orientations and determining the cutter orientation having the minimum undercut at the first plurality of cutter locations around the workpiece surface contour being machined.

4. The method according to claim 3, further comprising:

using the plurality of cutter locations and orientations having minimum undercut, determine curves which fit the cutter orientation spherical coordinates, $\theta$ and $\phi$.

5. A method of determining machining instructions during machining of a workpiece using a machine having a cutter, the surfaces of the workpiece being defined by a plurality of guide curves, including the steps of:

determine nominal flank milling machining instructions, including cutter orientation, at a plurality of cutter locations;

using the plurality of cutter locations and orientations, determine curves which fit the cutter orientation spherical coordinates, $\theta$ and $\phi$;

for each individual cutter location, using the values $\theta$ from the $\theta$ curve fit, determine a value for $\phi'$ such that the cutter lies on a workpiece guide curve;

for each individual cutter location, using the values $\phi$ from the $\phi$ curve fit, determine a value for $\theta'$ such that the cutter lies on a workpiece guide curve;

evaluate the plurality of $\theta'$ values and the plurality of $\phi'$ values to select which curve fit results in the least motion of the other spherical coordinate.

6. The method according to claim 5, further comprising:

using the selected curve fit, determine undercut at a plurality of cutter locations;

compare the determined undercut to a predetermined value, for such locations where the determined undercut exceeds the predetermined value, add an additional location to the plurality of cutter locations and repeat the steps of: determining curve fits for the cutter orientation spherical coordinates; determining values for $\phi'$ and $\theta'$; evaluating the $\phi'$ values and the $\theta'$ values to select the curve fit which results in the least motion of the other spherical coordinate.

7. A method of determining machining instructions during machining of a workpiece using a machine having a cutter, the surfaces of the workpiece being defined by a plurality of ruled surface guide curves, including the steps of:

determine a nominal flank milling machining instruction at an individual cutter location;

determine the cutter orientation and determine the undercut by evaluating the intersection of the cutter and the workpiece surface;

for a fixed cutter tip location, modify the cutter orientation by sliding the cutter shank along one of the ruled surface guide curves, determine the undercut by evaluating the intersection of the cutter and the workpiece surface at a plurality of cutter orientations, select the cutter orientation having the minimum undercut;

at a first plurality of cutter locations, repeat the steps of: determining a nominal flank milling instruction at a cutter location; determining the cutter orientation and undercut; modifying the cutter orientation, determining a plurality of undercuts at the first plurality of cutter orientations and determining the cutter orientation having the minimum undercut at the first plurality of cutter locations around the workpiece surface contour being machined;

using the plurality of cutter locations and orientations having minimum undercut, determine spline functions for the cutter orientation spherical coordinates, $\theta$ and $\phi$;

for each individual cutter location, using the values $\theta$ from the $\theta$ spline function determine a value for $\phi'$ such that the cutter lies on the workpiece ruled surface guide curves;

for each individual cutter location, using the values $\phi$ from the $\phi$ spline function determine a value for $\theta'$ such that the cutter lies on the workpiece ruled surface guide curves;

evaluate the plurality of $\theta'$ values and the plurality of $\phi'$ values to select which spline function results in the least motion of the other spherical coordinate;

using the selected spline function, determine undercut at a second plurality of cutter locations intermediate to the first plurality of cutter locations;

compare the determined undercut at the second plurality of cutter locations to a predetermined value, for such locations where the determined undercut exceeds the predetermined value, add an additional location to the first plurality of cutter locations and repeat the steps of: using a first plurality of cutter locations to determine the cutter location having a minimum undercut; determining spline functions for the cutter orientation spherical coordinates; determining values for $\phi'$ and $\theta'$; evaluating the $\phi'$ values and the $\theta'$ values to select the spline function which results in the least motion of the other spherical coordinate; and determining the undercut at the second plurality of locations intermediate to the first plurality of locations.

* * * * *